(12) United States Patent
Chang et al.

(10) Patent No.: US 8,512,662 B2
(45) Date of Patent: Aug. 20, 2013

(54) METHOD FOR ADSORBING AND DECOMPOSING LEAN NITROGEN OXIDE USING A MIXED METAL OXIDE CATALYST

(75) Inventors: Kil Sang Chang, Goyang-si (KR); Xiaoshan Peng, Seoul (KR); Ki Seon Yang, Seoul (KR)

(73) Assignee: Sangmyung University, Council for Industry Academic Cooperation, Cheonan-si, Chungcheongnam-do (KR)

( * ) Notice: Subject to any disclaimer, the term of this patent is extended or adjusted under 35 U.S.C. 154(b) by 0 days.

(21) Appl. No.: 13/504,028

(22) PCT Filed: Oct. 19, 2010

(86) PCT No.: PCT/KR2010/007159
§ 371 (c)(1),
(2), (4) Date: Apr. 25, 2012

(87) PCT Pub. No.: WO2011/052920
PCT Pub. Date: May 5, 2011

(65) Prior Publication Data
US 2012/0219487 A1    Aug. 30, 2012

(30) Foreign Application Priority Data
Oct. 26, 2009    (KR) .................. 10-2009-0101876

(51) Int. Cl.
*B01D 53/56*    (2006.01)

(52) U.S. Cl.
USPC ...................................... 423/239.1

(58) Field of Classification Search
USPC ...................................... 423/239.1
See application file for complete search history.

(56) References Cited

U.S. PATENT DOCUMENTS

| 5,407,652 A | * | 4/1995 | Swamy et al. ............ 423/239.1 |
| 5,705,136 A | | 1/1998 | Drago et al. |
| 6,858,193 B2 | | 2/2005 | Ruwisch et al. |
| RE39,553 E | * | 4/2007 | Li ............................. 423/239.1 |
| 7,740,818 B2 | * | 6/2010 | Han et al. .................. 423/213.5 |
| 2008/0287284 A1 | * | 11/2008 | Francis et al. ................. 502/63 |

FOREIGN PATENT DOCUMENTS

| EP | 1 262 224 A1 | 12/2002 |
| EP | 1 316 354 A1 | 6/2003 |
| JP | 10-080633 | 3/1998 |
| KR | 10-0563903 | 3/2006 |
| KR | 10-0638835 | 10/2006 |
| KR | 10-0654885 | 12/2006 |
| WO | 02/11866 A2 | 2/2002 |

* cited by examiner

*Primary Examiner* — Timothy Vanoy
(74) *Attorney, Agent, or Firm* — Volpe and Koenig, P.C.

(57) ABSTRACT

The present invention relates to a method of adsorbing and reducing nitrogen oxides using a mixed metal oxide catalyst, and more particularly, to a method of improving the efficiency of adsorption and desorption of nitrogen oxides using a mixed metal oxide catalyst prepared from a hydrotalcite precursor. According to the invention, NOx and $N_2O$, which coexist with oxygen ($O_2$) known to be very difficult to reduce and decompose, are efficiently decomposed by adsorbing and separating NOx and $N_2O$ from oxygen and then decomposing the adsorbed NOx and $N_2O$ using a reducing agent.

10 Claims, No Drawings

US 8,512,662 B2

METHOD FOR ADSORBING AND DECOMPOSING LEAN NITROGEN OXIDE USING A MIXED METAL OXIDE CATALYST

This application is a 35 U.S.C. §371 national phase application of PCT/KR2010/007159, which was filed Oct. 19, 2010 and is incorporated herein by reference as if fully set forth.

TECHNICAL FIELD

The present invention relates to a method of adsorbing and reducing nitrogen oxides using a mixed metal oxide catalyst, and more particularly, to a method of improving the efficiency of adsorption and desorption of nitrogen oxides using a mixed metal oxide catalyst prepared from a hydrotalcite precursor.

BACKGROUND ART

Nitrogen oxides (NOx) are typical air pollutants which cause smog, acid rain, photochemical smog by atmospheric photochemical reactions and various secondary pollutants ($O_2$, PAN, etc.) harmful to the human body and contribute to the eutrophication of aquatic ecosystems.

Also, nitrogen oxides are currently regulated emissions produced unavoidably from the combustion of most fossil fuels. As methods for decomposing and removing nitrogen oxides, selective catalytic reduction (SCR) technology is used, which utilizes three-way catalysts for gasoline engines, and $NH_3$ and hydrocarbons, etc., as reducing agents.

In such methods, the efficiency of decomposition of nitrogen oxides decreases rapidly when the nitrogen oxides coexist with other components such as oxygen. In addition, the selective catalytic reduction method that has been put into practical use has problems in that the range of reaction temperature is narrow, the performance of the catalyst is deteriorated due to aging, and set-up and operating costs are high. Thus, research and development have been continuously conducted in order to solve these problems.

Oxygen ($O_2$) is present in exhaust gases in case that a sufficient amount of oxygen is supplied for complete combustion of fossil fuels. In this case, the remaining oxygen greatly increases the consumption of NOx reducing agents or greatly reduces the reduction ability thereof. Thus, there is required a method that adsorbs NOx and then desorbs NOx, thereby preventing the NOx reduction ability of the reducing agent from being deteriorated due to the presence of oxygen and effectively achieving the decomposition of NOx. According to this requirement, the research and development of NOx adsorbing materials have been conducted.

NOx adsorbing materials are based on alkaline earth metal oxides such as BaO. The adsorption capacity of these oxides for NO is significantly lower than that for $NO_2$. For this reason, a catalyst for oxidizing and adsorbing NO needs to be used. As this catalyst, Pt that is an expensive transition metal is mainly used. However, the maximum adsorption capacity of these adsorbing materials is generally only 10~20 mg-NOx/g-cat at 350° C., and significantly deteriorates as temperature increases or decreases. In addition, because these adsorbing materials are based on $NO_2$-adsorbing components rather than NO-adsorbing components, their ability to decompose NOx in the desorption process is low, so that these adsorbing materials cannot act as effective adsorbing materials.

Patent document 1 discloses the reductive decomposition of nitrogen oxides. However, the patent document relates to the reductive decomposition of nitrogen oxides in case that no oxygen is present in exhaust gases. It is difficult to apply to the case in which oxygen is present.

Patent document 2 discloses a method of decomposing nitrogen oxides using carbon monoxide (CO). However, the patent document has a shortcoming in that, when oxygen is present, CO corresponding to the equivalent of oxygen is additionally required.

In addition, patent document 3 adopts a method of supplying CO resulting from partial oxidation of $CH_4$ and discloses a method of decomposing $N_2O$ and NOx using an MMO catalyst. However, in order to decompose lean NOx and $N_2O$, a method different from patent document 3 is required.

If oxygen is present in excess, it can be present in an amount much larger than that of NOx, which is at most several thousand ppm or less, and thus the consumption of CO for removing this oxygen will be very high. In this case, NOx treatment costs will be increased due to the consumption of the reducing agent, it will be difficult to find a suitable method for supplying CO, and the amount of $CO_2$ discharged can also be problematic.

Patent Document 1: Korean Patent Registration No. 563903

Patent Document 2: Korean Patent Registration No. 654885

Patent Document 3: Korean Patent Registration No. 638835

DETAILED DESCRIPTION OF THE INVENTION

Technical Problem

The present inventors have made extensive efforts to solve the above-described problems occurring in the prior art, and as a result, have found that the efficiency of decomposition of NOx and $N_2O$ can be greatly improved even in the presence of oxygen ($O_2$) by selectively adsorbing and separating nitrogen oxides including NOx and $N_2O$ from the coexisting oxygen using a mixed metal oxide catalyst prepared from a hydrotalcite-type precursor, and then desorbing the adsorbed nitrogen oxides. Based on this finding, the present invention has been completed.

Therefore, it is an object of the present invention to provide a method which uses a mixed metal oxide catalyst, prepared from a hydrotalcite-type precursor, to efficiently perform the decomposition of NOx and $N_2O$, which coexist with oxygen ($O_2$) known to be very difficult to reduce and decompose.

Technical Solution

In order to achieve the above object, the present invention provides a method for decomposing lean nitrogen oxides, comprising the steps of:

i) providing a catalyst layer comprising a mixed metal oxide catalyst prepared from a hydrotalcite-type compound precursor, a catalyst wherein a precious metal is impregnated or intercalated into the mixed metal oxide catalyst, or a catalyst wherein a co-catalyst is added and a non-precious metal is impregnated or intercalated into the mixed metal oxide catalyst;

ii) passing a waste gas, containing oxygen and nitrogen oxides and having an oxygen concentration of 0.01% or more, through the catalyst layer, to selectively adsorb the nitrogen oxides on the catalyst layer;

iii) passing a reducing agent through the catalyst layer having the nitrogen oxides adsorbed thereon; and iv) decomposing and desorbing the adsorbed nitrogen oxides by the reducing agent.

In one embodiment of the present invention, the hydrotalcite-type precursor is represented by the following formula 1:

$$[M^{2-}{}_{1-x}N^{3-}{}_x(OH)_2]^{x+}[A^{n-}{}_{x/n}\cdot bH_2O] \qquad \text{[Formula 1]}$$

wherein $X^{2+}$ is selected from the group consisting of $Mg^{2+}$, $Ca^{2+}$, $Ni^{2+}$, $Zn^{2+}$, $Sr^{2+}$, $Ba^{2+}$, $Fe^{2+}$, $Cu^{2+}$, $Co^{2+}$, $Pa^{2+}$ and $Mn^{2+}$; $N^{3+}$ is selected from the group consisting of $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$, $Ce^{3+}$ and $Rh^{3+}$; $A^{n-}$ is selected from the group consisting of $CO_3{}^{2-}$, $NO_3{}^-$, $SO_4{}^{2-}$, $Cl^-$, $OH$, $SiO_3{}^{2-}$, $MnO_4{}^{2-}$, $HPO_3{}^{2-}$, $MnO_4{}^{2-}$, $HGaO_3{}^{2-}$, $HVO_4{}^{2-}$, $ClO_4{}^-$ and $BO_3{}^{2-}$; x ranges from 0.0 to 0.5; and b is an integer ranging from 0 to 20.

In one embodiment of the present invention, the order of adsorption strength of adsorbants on the hydrotalcite-type or brucite-type precursor is $(NO, N_2O, NO_2, SO_2) > CC > C_2$.

In one embodiment of the present invention, $SO_2$ is desorbed from the catalyst by any one or more of $CO$, $NO$, $NO_2$, $O_2$ and $N_2$ in case that $SO_2$ is adsorbed onto the catalyst such that a decrease in the activity of the catalyst by the accumulation of $SO_2$ does not occur.

In one embodiment of the present invention, the precious metal is selected from the group consisting of Mo, Ti, Pt, Au, Ag, Rh, Pa, La, Ir, V, Kr, Nd, Nb, Se, Sc, Ru, In, Y, Z, and mixtures thereof, and the amount of the precious metal in the intercalated catalyst is preferably 0.01 to 50 wt %.

In one embodiment of the present invention, the co-catalyst is selected from among alkali metals, and the non-precious metal is selected from the group consisting of Ni, Co, Fe, Mn, Al, Ce, Zr, Cu, Zn, Ba, Mg, Ca, Sr, and mixtures thereof. In addition, the content of the non-precious metal in the intercalated catalyst is 0.01 to 99.9 wt %.

In one embodiment of the present invention, the reducing agent further comprises a component selected from the group consisting of CO, $H_2$, $C_1$-$C_6$ hydrocarbons, $C_1$-$C_6$ alcohols, and mixtures thereof.

In one embodiment of the present invention, the hourly space velocity of gas during passage through the catalyst layer is $1,000\ h^{-1}$ to $300,000\ h^{-1}$.

In one embodiment of the present invention, the reaction temperature is preferably 20 to 1,000° C.

In one embodiment of the present invention, the waste gas preferably comprises 0.001-30 wt % of $N_2O$, 0.001-10 wt % of NO, 0.001-21 wt % of $O_2$, 0.001-20 wt % of the reducing agent, and a balance of other contaminants and inert carrier gases.

Advantageous Effects

According to the method of the present invention, NOx and $N_2O$ in a waste gas, which have an oxygen concentration of 0.01% or more and contain NOx and oxygen; or NOx, $N_2O$ and oxygen, known to be very difficult to reduce and decompose, can be efficiently decomposed by adsorbing and separating NOx and $N_2O$ from oxygen and then decomposing the adsorbed NOx and $N_2O$ using a reducing agent.

In addition, adsorbing materials mainly adsorb $NO_2$, and thus an expensive catalyst such as Pt should be used to oxidize NO and an increased amount of a reducing agent should also be used for desorption of NO. On the other hand, when the mixed metal oxide (MMO) catalyst as described in the present invention is used, it shows a higher adsorption capacity for NO, and thus is advantageous in terms of cost.

BEST MODE FOR CARRYING OUT THE INVENTION

Hereinafter, the present invention will be described in further detail.

As described above, the present invention is characterized in that lean $N_2O$ or NOx and $N_2O$ are adsorbed and separated from oxygen in the presence of a mixed metal oxide catalyst prepared from a hydrotalcite-type or brucite-type and are decomposed and desorbed in an oxygen-free state.

Hydrotalcite compounds are generally based on anionic clays and are composed of hydrates of magnesium or aluminum, which are abundant on the earth. These hydrotalcite compounds can be synthesized at room temperature and atmospheric pressure. Until now, hydrotalcites have been used mainly as precursors of oxide catalysts, and supported or impregnated or intercalated hydrotalcite compounds have not yet been put into practical use.

The hydrotalcite precursor that is used in the present invention can be represented by the following formula 1:

$$[M^{2-}{}_{1-x}N^{3-}{}_x(OH)_2]^{x+}[A^{n-}{}_{x/n}\cdot bH_2O] \qquad \text{[Formula 1]}$$

In the hydrotalcite-type or brucite-type precursor, $M^{2+}$ and $N^{3+}$ are metal cations, respectively. Specifically, $M^{2+}$ is a divalent metal cation selected from the group consisting of $Mg^{2+}$, $Ca^{2+}$, $Ni^{2+}$, $Zn^{2+}$, $Sr^{2+}$, $Ba^{2+}$, $Fe^{2+}$, $Cu^{2+}$, $Co^{2+}$, $Pd^{2+}$ and $Mn^{2+}$, and $N^{3+}$ is a trivalent metal cation selected from the group consisting of $Rh^{3+}$, $Al^{3+}$, $Mn^{3+}$, $Fe^{3+}$, $Co^{3+}$, $Ni^{3+}$, $CP^+$, $Ga^{3+}$, $B^{3+}$, $La^{3+}$ and $Ce^{3+}$. The molar ratio of $M^{2+}:N^{3+}$ is 1:1 to 100:1, and preferably 1:1 to 5:1. In the hydrotalcite-type precursor, A is an anionic compound having a charge of −1, −2 or −3 and is one or a combination of two or more selected from the group consisting of $CO_3{}^{2-}$, $NO_{3-}$, $SO_4{}^{2-}$, $Cl^-$, $OH^-$, $SiO_3{}^{2-}$, $MnO_4{}^{2-}$, $HPO_3{}^{2-}$, $MnO_4{}^{2-}$, $HGaO_3{}^{2-}$, $HVO_4{}^{2-}$, $ClO_4{}^-$ and $BO_3{}^{2-}$, x ranges from 0.0 to 0.5, and b is an integer ranging from 0 to 20.

The hydrotalcite-type precursor is calcined at a temperature of 100 to 1,000° C. to prepare a mixed metal oxide. In order to increase the catalytic activity of the mixed metal oxide catalyst, at least one precious metal selected from among Mo, Ti, Pt, Au, Ag, Rh, Pd, La, Ir, V, Kr, Nd, Nb, Se, Sc, Ru, In, Y and Zr may optionally be impregnated or intercalated into the mixed metal oxide.

The amount of the precious metal in the intercalated catalyst is preferably 0.01 to 50 wt %.

In one embodiment of the present invention, the mixed metal oxide (MMO) catalyst that is used in the method of the present invention may be impregnated or intercalated with a non-precious metal. In general, a precious metal is expensive, but the use of a co-catalyst allows a non-precious metal such as Ni to substitute for a precious metal.

The co-catalyst that is used in the present invention may be an alkali metal. Preferably, it is selected from the group consisting of Na, K, Rb, and Cs. Moreover, the non-precious metal may be one or more selected from the group consisting of Ni, Co, Fe, Mn, Al, Ce, Zr, Cu, Zn, Ba, Mg, Ca, Sr, and mixtures thereof. The amount of the non-precious metal in the intercalated catalyst is preferably 0.01 to 99.9 wt %.

The present invention uses the adsorption capacity of the MMO catalyst, and the order of adsorption strength of adsorbants on the MMO catalyst is generally $(NO, N_2O, NO_2, SO_2) > CO > O_2$. Namely, the adsorption strength of $NO, N_2O$, $NO_2$ and $SO_2$ is higher than that of $CO$ and $O_2$, but the order of adsorption strength between $NO$, $N_2O$, $NO_2$ and $SO_2$ can vary depending on, for example, the composition of the catalyst.

As described above, NO and $N_2O$ are more easily adsorbed than oxygen. Thus, when an exhaust gas containing an excessive amount of oxygen passes through the catalyst layer for adsorption, NO and $N_2O$ can be more adsorbed than oxygen. In other words, the majority of oxygen passes through the catalyst layer while NO and $N_2O$ are adsorbed on the catalyst and thus separated from oxygen. The separated NO and $N_2O$ are then easily reduced by a reducing agent such as CO, and the reaction with oxygen can be eliminated. Thus, the consumption of CO is low and the rate of desorption of NO and $N_2O$ from the catalyst layer is fast.

The MMO catalyst generally shows a higher adsorption capacity for NO. $SO_2$ known as a catalyst poison is strongly adsorbed compared to CO, $O_2$ and the like, but shows adsorption strength similar to NO, $NO_2$ and the like. However, according to the present invention, $SO_2$ adsorbed on the catalyst layer is desorbed by CO, NO, $NO_2$, $O_2$ and $N_2$, a decrease in the NOx adsorption efficiency or activity of the catalyst, caused by the accumulation of $SO_2$, does not substantially occur.

In the inventive method of adsorbing and decomposing lean NOx, or NOx and $N_2O$ using the mixed metal oxide catalyst prepared from the hydrotalcite-type precursor, a waste gas that passes through the catalyst layer comprises 0 to 30 wt % of $N_2O$, 0.001 to 10 wt % of NO, 0.001 to 20 wt % of a reducing agent, 0.001 to 21 wt % of $O_2$, and the balance of other contaminants and inert gases such as $N_2$.

If the amount of the reducing agent in the gas mixture is less than 0.001 wt %, it will not sufficiently reduce NO and $N_2O$ into $N_2$ and $O_2$, and if it is more than 20 wt %, large amounts of unreacted reducing agent and reaction by-products will be produced, and thus another process for removing them will be required.

In the present invention, the reducing agent may be one or more selected from the group consisting of CO, $H_2$, $C_1$-$C_6$ hydrocarbons, $C_1$-$C_6$ alcohols, and $NH_3$.

In the catalytic decomposition reaction of the present invention, the gas hourly space velocity (GHSV) of the gas during passage through the catalyst layer is between 1,000 $h^{-1}$ and 300,000 $h^{-1}$, preferably between 30,000 and 200,000 $h^{-1}$. If the GHSV is lower than 1,000 $h^{-1}$, it will not be economical, because the amount of gas treated is small, and if the GHSV is higher than 200,000 $h^{-1}$, the time of contact with the catalyst will be short, and thus the adsorption of NOx or $N_2O$ will decrease.

Meanwhile, the pressure of the gas during passage through the catalyst layer is preferably atmospheric pressure (1 atm) or higher, and an increase in the pressure leads to an increase in the adsorption rate of nitrogen oxides.

According to the present invention, the temperature of the gas during passage through the catalyst layer is 20 to 1,000° C., and preferably 200 to 500° C. If the temperature of the gas during passage through the catalyst layer is lower than 20° C., the adsorption, reduction and desorption rates of nitrogen oxides will decrease, and if it is higher than 1000° C., it will thermally damage the catalyst and the support.

MODE FOR INVENTION

Hereinafter, the present invention will be described with reference to the following examples in order to more clearly describe the effects of the present invention.

Example 1

A gas comprising 747 ppm of NOx, 1.69% of $O_2$ and a balance of nitrogen was passed over 1.285 g of a metal oxide catalyst, prepared from a hydrotalcite precursor and having a molar ratio of Al:Pd:Co=1:0.02:1, at 300° C. and a flow rate of 500 ml/min (SV 39,000 $hr^{-1}$) for 55 minutes. As a result, 8.6 mg of NO per g of the catalyst (mg-NO/g-cat.) was adsorbed on the catalyst.

11.1 mg-NO (8.6 mg-NO/g-cat.) adsorbed as described was completely decomposed and desorbed using 4,800 ppm of CO for 30 minutes at 300° C. at a flow rate of 500 ml/min (SV 39,000 $hr^{-1}$).

Example 2

A gas comprising 1,300 ppm of $N_2O$, 1.48% of $O_2$ and a balance of nitrogen was passed over 1.285 g of a metal oxide catalyst, prepared from a hydrotalcite precursor and having a molar ratio of Al:Pd:Co=1:0.02:1, at 300° C. and a flow rate of 500 ml/min (SV 39,000 $hr^{-1}$) for 50 minutes. As a result, 16.7 mg of $N_2O$ per g of the catalyst (mg-$N_2O$/g-cat.) was adsorbed on the catalyst.

21.44 mg-$N_2O$ (16.7 mg-$N_2O$/g-cat.) adsorbed as described was completely decomposed and desorbed using 4,850 ppm of CO for 17 minutes at 300° C. at a flow rate of 500 ml/min (SV 39,000 $hr^{-1}$).

Example 3

A gas comprising 1% of $O_2$ and a balance of nitrogen was passed over 2.729 g of a metal oxide catalyst, prepared from a hydrotalcite precursor and having a molar ratio of Al:Pd:Co=1:0.05:1, at 300° C. and a flow rate of 500 ml/min (SV 20,000 $hr^{-1}$) for 45 minutes. As a result, 54.4 mg of $O_2$ per g of the catalyst (mg-$O_2$/g-cat.) was adsorbed on the catalyst.

148.55 mg-$O_2$ (54.4 mg-$O_2$/g-cat.) adsorbed as described was completely decomposed and desorbed using 4,000 ppm of CO for 4 hours and 46 minutes at 500° C. at a flow rate of 500 ml/min (SV 20,000 $hr^{-1}$).

Example 4

A gas comprising 484 ppm of NOx, 1.02% of $O_2$ and a balance of nitrogen was passed over 1.294 g of a metal oxide catalyst, prepared from a hydrotalcite precursor and having a molar ratio of Al:Pd:Co=1:0.05:1, at 300° C. and a flow rate of 500 ml/min (SV 37,500 $hr^{-1}$) for 1 hour. As a result, 7.7 mg of NO per g of the catalyst (mg-NO/g-cat.) was adsorbed on the catalyst.

9.9 mg-NO (7.7 mg-NO/g-cat.) adsorbed as described was completely decomposed and desorbed using 4,667 ppm of CO at 300° C. for 16 minutes at a flow rate of 500 ml/min (SV 37,500 $hr^{-1}$).

Example 5

A gas comprising 600 ppm of NO, 1.65% of $O_2$ and a balance of nitrogen was passed over 3.684 g of a metal oxide catalyst, prepared from a hydrotalcite precursor and having a molar ratio of Ni:K=1:0.5, at 300° C. and a flow rate of 500 ml/min (SV 37,500 $hr^{-1}$) for 5 hours. As a result, 8.5 mg of NO per g of the catalyst (mg-NO/g-cat.) was adsorbed on the catalyst.

31.3 mg-NO (8.5 mg-NO/g-cat.) adsorbed as described was completely decomposed and desorbed using 4,500 ppm of CO at 500° C. for 60 minutes at a flow rate of 500 ml/min (SV 37,500 $hr^{-1}$).

Example 6

A gas comprising 440 ppm of NO, 1.14% of $O_2$ and a balance of nitrogen was passed over 3.72 g of a metal oxide catalyst, prepared from a hydrotalcite precursor and having a molar ratio of Ni:K:Pd=1:0.2:0.1, at 300° C. and a flow rate of 500 ml/min (SV 33,000 hr$^{-1}$) for hours. As a result, 1.16 mg of NO per g of the catalyst (mg-NO/g-cat.) was adsorbed on the catalyst.

4.3 mg-NO (1.16 mg-NO/g-cat.) adsorbed as described was desorbed with nitrogen at 500° C. and then completely decomposed using 3,000 ppm of CO for 90 minutes at a flow rate of 500 ml/min (SV 33,000 hr$^{-1}$).

Example 7

A gas comprising 284 ppm of NOx, 1.37% of O$_2$ and a balance of nitrogen was passed over 3.601 g of a metal oxide catalyst, prepared from a hydrotalcite precursor and having a molar ratio of Ni:Pd:Co=1:0.1:1, at 300° C. and a flow rate of 700 ml/min (SV 42,000 hr$^{-1}$) for 45 minutes. As a result, 0.27 mg of NO per g of the catalyst (mg-NO/g-cat.) was adsorbed on the catalyst.

0.98 mg-NO (0.27 mg-NO/g-cat.) adsorbed as described was completely decomposed and desorbed using 4,695 ppm of CO at 300° C. for 2 hours and 44 minutes at a flow rate of 700 ml/min (SV 42,000 hr$^{-1}$).

Example 8

A gas comprising 1,376 ppm of N$_2$O, 1.48% of O$_2$ and a balance of nitrogen was passed over 3.601 g of a metal oxide catalyst, prepared from a hydrotalcite precursor and having a molar ratio of Ni:Pd:Co=1:0.1:1, at 300° C. and a flow rate of 500 ml/min (SV 30,000 hr$^{-1}$) for 55 minutes. As a result, 3.25 mg of N$_2$O per g of the catalyst (mg-N$_2$O/g-cat.) was adsorbed on the catalyst.

11.7 mg-N$_2$O (3.25 mg-N$_2$O/g-cat.) adsorbed as described was completely decomposed and desorbed using 4,728 ppm of CO at 300° C. for 1 hour and 5 minutes at a flow rate of 500 ml/min (SV 30,000 hr$^{-1}$).

As can be seen in the above examples, the catalysts according to the present invention showed high adsorption capacity and had the property of rapidly decomposing nitrogen oxides.

It was reported that Pt-impregnated catalysts based on BaO generally have an adsorption capacity of 10 to 20 mg-NOx/g-cat (at 300~350° C.). In comparison with such catalysts, it can be seen that the catalysts according to the present invention have significantly high adsorption capacity and the property of rapidly decomposing nitrogen oxides using CO.

Although the preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for decomposing nitrogen oxides using a mixed metal oxide catalyst, the method comprising the steps of:
   i) providing a catalyst layer comprising a mixed metal oxide catalyst prepared from a hydrotalcite-type or brucite-type compound precursor, a catalyst wherein a precious metal is impregnated or intercalated into the mixed metal oxide catalyst, or a catalyst wherein a co-catalyst is added and a non-precious metal is impregnated or intercalated into the mixed metal oxide catalyst;
   ii) passing a waste gas containing oxygen and nitrogen oxides and having an oxygen concentration of 0.01% or more, through the catalyst layer, to selectively adsorb the nitrogen oxides on the catalyst layer;
   iii) passing a reducing agent through the catalyst layer having the nitrogen oxides adsorbed thereon; and
   iv) decomposing and desorbing the adsorbed nitrogen oxides by the reducing agent.

2. The method of claim 1, wherein the hydrotalcite-type or the brucite-type precursor is represented by the following formula 1:

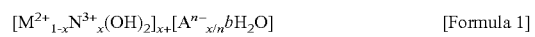   [Formula 1]

wherein X$^{2+}$ is selected from the group consisting of Mg$^{2+}$, Ca$^{2+}$, Ni$^{2+}$, Zn$^{2+}$, Sr$^{2+}$, Ba$^{2+}$, Fe$^{2+}$, Cu$^{2+}$, Co$^{2+}$, Pa$^{2+}$ and Mn$^{2+}$; N$^{3+}$ is selected from the group consisting of Al$^{3+}$, Mn$^{3+}$, Fe$^{3+}$, Co$^{3+}$, Ni$^{3+}$, CP$^{3+}$, Ga$^{3+}$, B$^{3+}$, La$^{3+}$, Ce$^{3+}$ and Rh$^{3+}$; A$^{n-}$ is selected from the group consisting of CO$_3^{2-}$, NO$_3^-$, SO$_4^{2-}$, Cl$^-$, OH$^-$, SiO$_3^{2-}$, MnO$_4^{2-}$, HPO$_3^{2-}$, MnO$_4^{2-}$, HGaO$_3^{2-}$, HVO$_4^{2-}$, ClO$_4^-$ and BO$_3^{2-}$; x ranges from 0.0 to 0.5; and b is an integer ranging from 0 to 20.

3. The method of claim 2, wherein the order of adsorption strength of adsorbants on the hydrotalcite-type precursor is (NO, N$_2$O, NO$_2$, SO$_2$)>CO>O$_2$.

4. The method of claim 1, wherein, SO$_2$ is desorbed from the catalyst by any one or more of CO, NO, NO$_2$, O$_2$ and N$_2$ in case that SO$_2$ is adsorbed on the catalyst such that a decrease in the activity of the catalyst by the accumulation of SO$_2$ does not occur.

5. The method of claim 1, wherein the precious metal is selected from the group consisting of Mo, Ti, Pt, Au, Ag, Rh, Pa, La, Ir, V, Kr, Nd, Nb, Se, Sc, Ru, In, Y, Z, and mixtures thereof, and the amount of the precious metal in the intercalated catalyst is 0.01-50 wt %.

6. The method of claim 1, wherein the co-catalyst is selected from among alkali metals, and the non-precious metal is selected from the group consisting of Ni, Co, Fe, Mn, Al, Ce, Zr, Cu, Zn, Ba, Mg, Ca, Sr, and mixtures thereof, and the amount of the non-precious metal in the intercalated catalyst is 0.01-99.9 wt %.

7. The method of claim 1, wherein the reducing agent further comprises a component selected from the group consisting of CO, H$_2$, C$_1$-C$_6$ hydrocarbons, C$_1$-C$_6$ alcohols, and mixtures thereof.

8. The method of claim 1, wherein the hourly space velocity of the gas during passage through the catalyst layer is 1,000 h$^{-1}$ to 300,000 h$^{-1}$.

9. The method of claim 1, wherein the reaction temperature is 20 to 1,000° C.

10. The method of claim 1, wherein the waste gas comprises 0.001 to 30 wt % of N$_2$O, 0.001 to 10 wt % of NO, 0.001 to 21 wt % of O$_2$, 0.001 to 20 wt % of the reducing agent, and a balance of other contaminants and inert carrier gases.

* * * * *

UNITED STATES PATENT AND TRADEMARK OFFICE
CERTIFICATE OF CORRECTION

PATENT NO.           : 8,512,662 B2                                              Page 1 of 1
APPLICATION NO.      : 13/504028
DATED                : August 20, 2013
INVENTOR(S)          : Chang et al.

It is certified that error appears in the above-identified patent and that said Letters Patent is hereby corrected as shown below:

In the Claims:

In claim 2, at column 8, line 17, after the word "wherein", delete "$X^{2+}$" and insert therefor --$M^{2+}$--.

Signed and Sealed this
Eighteenth Day of February, 2014

Michelle K. Lee
*Deputy Director of the United States Patent and Trademark Office*